(12) United States Patent
Lee

(10) Patent No.: US 9,428,140 B2
(45) Date of Patent: Aug. 30, 2016

(54) AIRBAG MODULE

(71) Applicant: HYUNDAI MOBIS CO., LTD., Seoul (KR)

(72) Inventor: Hyo Bae Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/334,634

(22) Filed: Jul. 17, 2014

(65) Prior Publication Data

US 2015/0336532 A1 Nov. 26, 2015

(30) Foreign Application Priority Data

May 23, 2014 (KR) .................. 10-2014-0062043
May 23, 2014 (KR) .................. 10-2014-0062044

(51) Int. Cl.
*B60R 21/239* (2006.01)
*B60R 21/00* (2006.01)

(52) U.S. Cl.
CPC ...... *B60R 21/239* (2013.01); *B60R 2021/0048* (2013.01); *B60R 2021/2395* (2013.01)

(58) Field of Classification Search
CPC .............. B60R 21/239; B60R 21/233; B60R 2021/0048; B60R 2021/2395
USPC ......... 280/729, 735, 740, 743.1, 743.2, 736, 280/742
See application file for complete search history.

(56) References Cited

U.S. PATENT DOCUMENTS

| | | | | |
|---|---|---|---|---|
| 3,476,402 A * | 11/1969 | Wilfert | ........... | B60R 21/233 280/729 |
| 3,768,830 A * | 10/1973 | Hass | ........... | B60R 21/233 280/729 |
| 4,262,931 A * | 4/1981 | Strasser | ........... | B60R 21/233 280/729 |
| 5,282,646 A * | 2/1994 | Melvin | ........... | B60R 21/233 280/728.1 |
| 5,529,337 A * | 6/1996 | Takeda | ........... | B60R 21/233 280/729 |
| 5,577,765 A * | 11/1996 | Takeda | ........... | B60R 21/233 280/729 |
| 6,962,363 B2 * | 11/2005 | Wang et al. | ........... | 280/729 |
| 7,654,561 B2 * | 2/2010 | Webber et al. | ........... | 280/729 |
| 7,661,700 B2 * | 2/2010 | Imamura | ........... | B60R 21/203 280/730.1 |
| 7,686,333 B2 * | 3/2010 | Choi | ........... | 280/743.2 |
| 7,762,576 B2 * | 7/2010 | Cho | ........... | 280/729 |
| 7,922,191 B2 * | 4/2011 | Choi | ........... | 280/729 |
| 8,419,050 B2 * | 4/2013 | Yoo | ........... | 280/729 |
| 9,150,186 B1 * | 10/2015 | Belwafa | ........... | B60R 21/233 |
| 2005/0230945 A1 * | 10/2005 | Watanabe | ........... | B60R 21/18 280/733 |
| 2008/0023945 A1 * | 1/2008 | Zauritz | ........... | B60R 21/23138 280/729 |
| 2008/0048420 A1 * | 2/2008 | Washino | ........... | B60R 21/203 280/731 |

(Continued)

FOREIGN PATENT DOCUMENTS

KR 10-0196180 B1 6/1999
KR 10-2007-0022650 A 2/2007

(Continued)

*Primary Examiner* — Darlene P Condra

(57) ABSTRACT

The present invention provides an airbag module including: a main cushion which is expanded by inflow gas; an auxiliary chamber which is provided at one side of the main cushion; and an active vent which is provided between the main cushion and the auxiliary chamber, selectively forms a vent in accordance with an operation of an operating unit, and allows the main cushion and the auxiliary chamber to communicate with each other, and has an effect in that a problem with an excessive decrease in internal pressure due to an active vent may be improved, and as a result, injury to a head or a neck of an occupant may be reduced when an airbag is operated.

10 Claims, 4 Drawing Sheets

(56) References Cited

U.S. PATENT DOCUMENTS

| | | | |
|---|---|---|---|
| 2008/0157512 A1* | 7/2008 | Stevens | 280/743.2 |
| 2008/0238050 A1* | 10/2008 | Green et al. | 280/728.3 |
| 2013/0015641 A1* | 1/2013 | Mendez | 280/728.2 |
| 2013/0093170 A1* | 4/2013 | Mendez | 280/743.2 |
| 2014/0035264 A1* | 2/2014 | Fukushima et al. | 280/730.2 |
| 2014/0097603 A1* | 4/2014 | Chung et al. | 280/770 |

FOREIGN PATENT DOCUMENTS

| | | |
|---|---|---|
| KR | 10-2010-0089666 A | 8/2010 |
| KR | 10-2010-0132731 A | 12/2010 |
| KR | 10-2012-0010716 A | 2/2012 |
| KR | 10-1189467 B1 | 10/2012 |
| KR | 10-2013-0034726 A | 4/2013 |
| KR | 10-2013-0062521 A | 6/2013 |

* cited by examiner

AIRBAG MODULE

CROSS-REFERENCE TO RELATED APPLICATIONS

This application claims priority to and the benefit of Korean Patent Application No. 10-2014-0062043 and No. 10-2014-0062044 filed in the Korean Intellectual Property Office on May 23, 2014, the entire contents of which are incorporated herein by reference.

TECHNICAL FIELD

The present invention relates to an airbag module, and more particularly, to an airbag module which improves a problem with an excessive decrease in internal pressure due to an active vent, and improves collision performance.

BACKGROUND ART

In general, in order to protect a driver and an occupant at the time of a vehicle collision, airbag modules are used by being mounted in a steering handle and an instrument panel.

The airbag module deploys an airbag at the time of a vehicle collision so as to prevent the driver or the occupant from colliding with a crash pad or a wind shield that are provided in a vehicle, thereby reducing injury due to a collision.

The airbag module includes an airbag housing cover, an inflator which generates gas at the time of a vehicle collision, an airbag which is deployed by gas generated by the inflator, a separate detection sensor, and an electronic control module which explodes a detonator of the inflator.

The inflator includes the detonator which is ignited by an operational control signal that is output from the electronic control module, and a gas generation body which generates gas as the detonator is ignited.

According to the general airbag module that is configured as described above, when a traveling speed is rapidly decreased due to a head-on collision, an impact sensor detects the decrease in traveling speed and generates a preset signal, and the electronic control module, which recognizes an impact signal output from the impact sensor, ignites the detonator so as to combust the gas generation body.

In this case, the airbag is rapidly expanded and deployed because the gas generation body rapidly generates gas, the deployed airbag cushion prevents the head and chest of the occupant from being moved toward a front side of the vehicle by inertia so as to protect the occupant, and at the same time, impact energy is absorbed by discharging expanded gas through a vent hole formed in the airbag cushion, impact force transmitted to the occupant at the time of a vehicle collision is effectively absorbed, and as a result, injury to the occupant may be reduced.

Meanwhile, recently, an active vent is used in order to prevent injury to a head or a neck of the occupant from being increased due to an excessive increase in pressure of the airbag when the airbag is operated.

The active vent closes the vent hole when the airbag is deployed, and opens the vent hole by a vent operation signal so as to lower pressure in the airbag. As a result, injury to the head or the neck of the occupant may be reduced by the decrease in pressure in the airbag.

However, because pressure in the airbag is continuously and quickly reduced after the vent hole is opened by an operation of the active vent, relative motion of the head and the neck of the occupant is increased, and as a result, there is a problem in that injury to the neck is increased.

LITERATURE OF RELATED ART

Patent Literature

Korean Patent Application Laid-Open No. 10-2013-0062521 (Jun. 13, 2013)

SUMMARY OF THE INVENTION

The present invention has been made in an effort to provide an airbag module which improves a problem with an excessive decrease in internal pressure due to an active vent, and improves collision performance.

An exemplary embodiment of the present invention provides an airbag module including: a main cushion which is expanded by inflow gas; an auxiliary chamber which is provided at one side of the main cushion; and an active vent which is provided between the main cushion and the auxiliary chamber, selectively forms a vent in accordance with an operation of an operating unit, and allows the main cushion and the auxiliary chamber to communicate with each other.

A first vent through which gas is discharged may be formed at one side of the main cushion.

A second vent through which gas is discharged may be formed at one side of the auxiliary chamber.

A volume of the auxiliary chamber may be 50% or less of a volume of the main cushion.

The first vent formed at one side of the main cushion may be greater than the second vent formed at one side of the auxiliary chamber.

A size of the active vent may be greater than a size of the second vent formed at one side of the auxiliary chamber.

The auxiliary chamber may be provided at each of both sides of the main cushion.

The auxiliary chamber may be provided at one of upper and lower sides of the main cushion.

The auxiliary chambers may be divided and provided at a plurality of sides selected from upper, lower, left and right sides including a front side of the main cushion.

According to the airbag module of the present invention, there is an effect in that a problem with an excessive decrease in internal pressure due to the active vent may be improved, and as a result, injury to the head or the neck of the occupant may be reduced when the airbag is operated.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
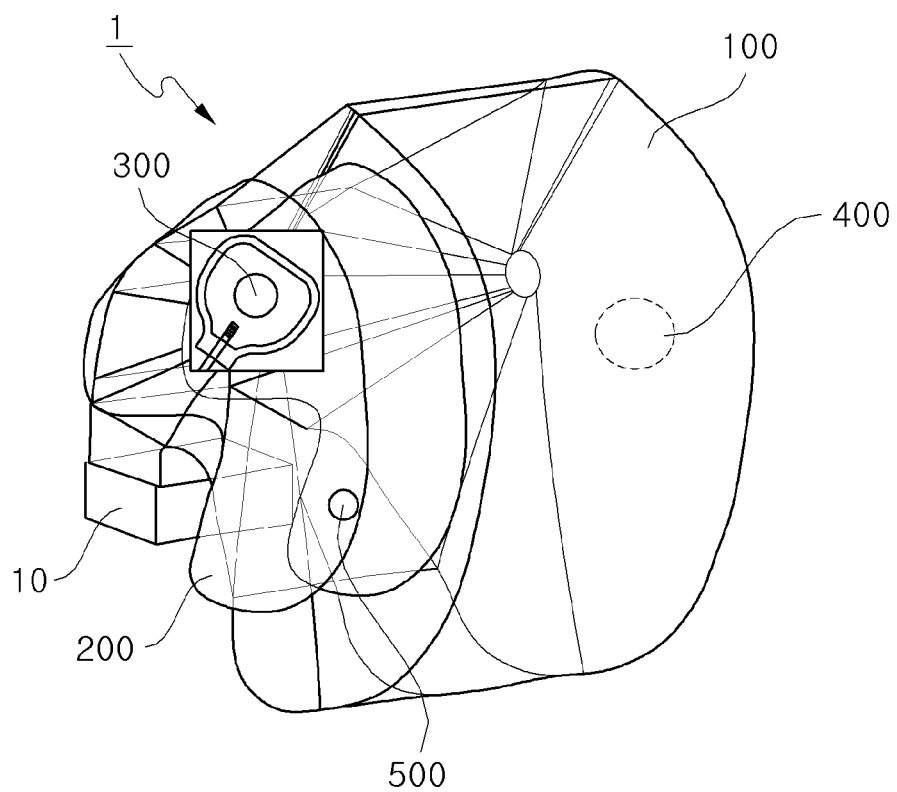
FIG. 1 is a perspective view of an airbag module according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same elements will be designated by the same reference numerals although they are shown in different drawings. Hereinafter, an exemplary embodiment of the present invention will be described, but, of course, the technical spirit of the present invention is not restricted or limited thereto, but the exemplary embodiment of the present invention may be modified by a person with ordinary skill in the art to be variously performed.

Figure 2:
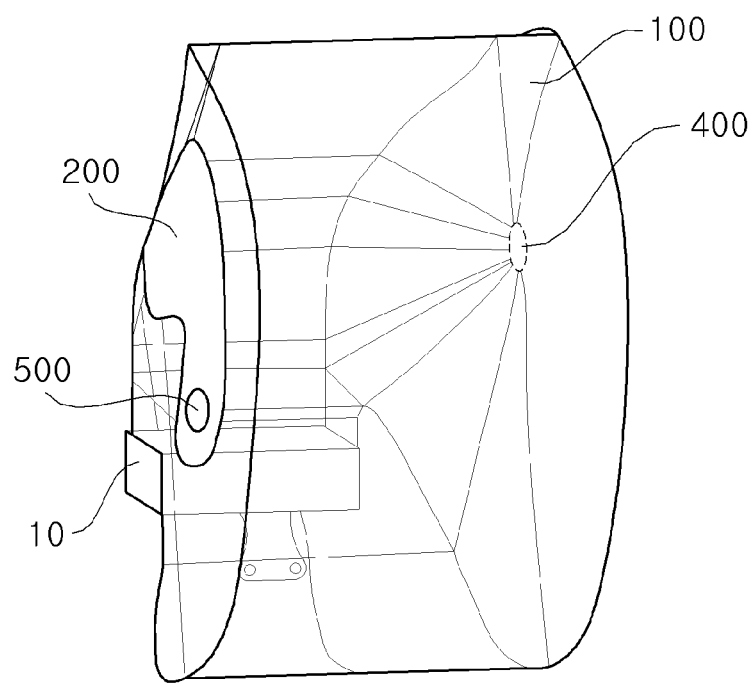
FIG. 2 is a perspective view illustrating an appearance before an active vent of the airbag module of FIG. 1 is operated.
Figure 3:
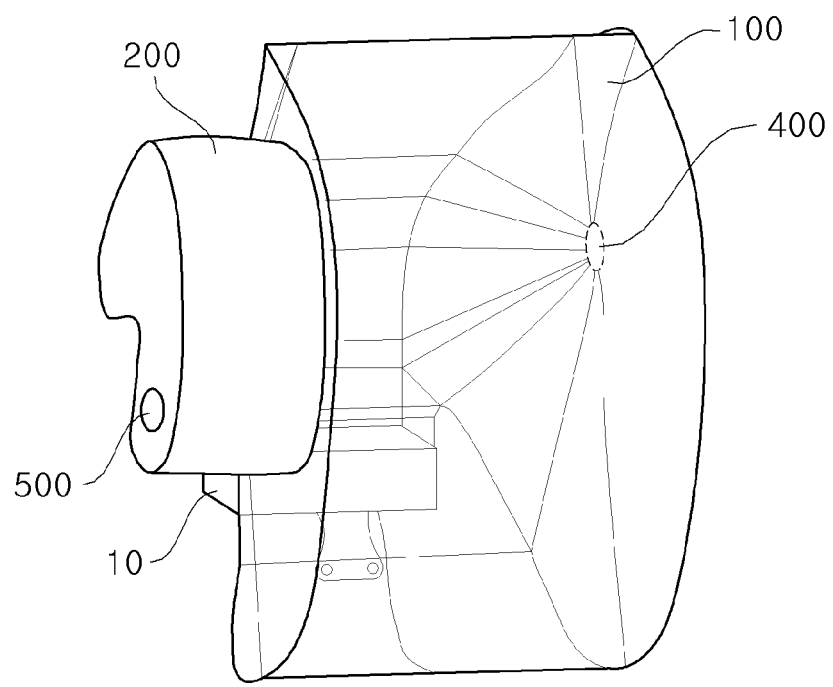
FIG. 3 is a perspective view illustrating an appearance after the active vent of the airbag module of FIG. 1 is operated.
Figure 4:
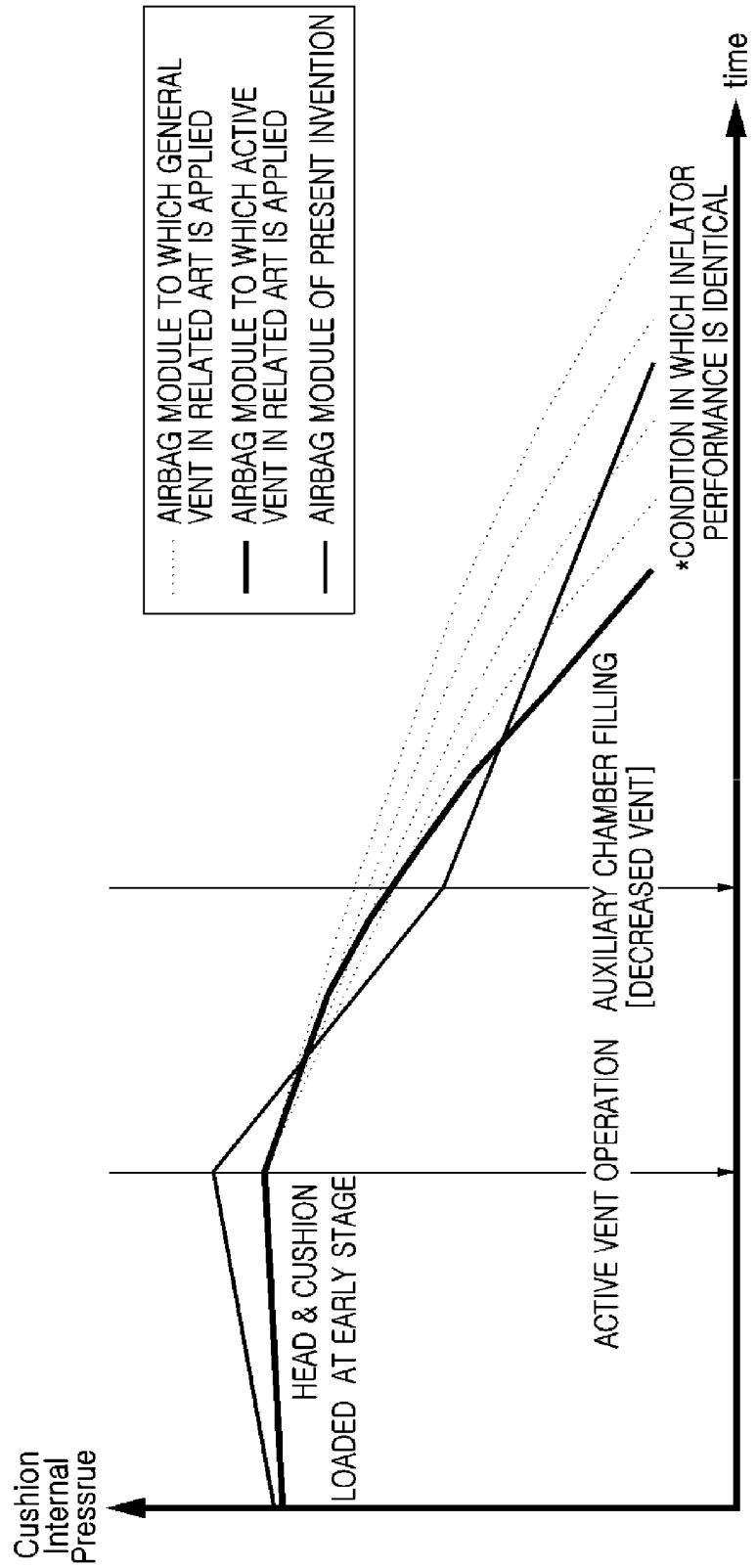
FIG. 4 is a graph illustrating pressure distribution of a main cushion when the airbag module is operated.

FIG. 1 is a perspective view of an airbag module according to an exemplary embodiment of the present invention, FIG. 2 is a perspective view illustrating an appearance before an active vent of the airbag module of FIG. 1 is operated, FIG. 3 is a perspective view illustrating an appearance after the active vent of the airbag module of FIG. 1 is operated, and FIG. 4 is a graph illustrating pressure distribution of a main cushion when the airbag module is operated.

Referring to FIG. 1, an airbag module 1 according to an exemplary embodiment of the present invention includes a main cushion 100 which is expanded by inflow gas, an auxiliary chamber 200 which is provided at one side of the main cushion 100, and an active vent 300 which is provided between the main cushion 100 and the auxiliary chamber 200, selectively forms a vent in accordance with an operation of an operating unit, and communicates the main cushion 100 to the auxiliary chamber 200.

The main cushion 100 has an inlet through which gas flows in, and is deployed while being expanded by an inflow of gas that is generated by an inflator 10 at the time of a vehicle collision. The main cushion 100 comes into contact with an occupant at the time of a vehicle collision in a state in which the main cushion 100 is expanded, thereby mitigating collision impact applied to the occupant.

In the present exemplary embodiment, a first vent 400, which discharges inside gas, is formed in a side surface of the main cushion 100. When the occupant comes into contact with the main cushion 100 after the main cushion 100 is deployed, the first vent 400 discharges gas in the main cushion 100 so as to absorb and mitigate collision impact applied to the occupant.

The auxiliary chamber 200 is provided at one side of the main cushion 100. That is, the auxiliary chambers 200 may be provided at upper, lower, left and right sides including a front side of the main cushion 100. However, in a case in which the auxiliary chamber 200 is formed at the front side of the main cushion 100, the auxiliary chamber 200 is provided in a front edge region of the main cushion 100 except for a portion where the occupant collides with the main cushion 100.

An additional cushion part is formed by providing the auxiliary chamber 200, such that it is possible to enlarge an occupant protection region where the occupant is protected from impact at the time of a vehicle collision. Particularly, in a case in which the auxiliary chambers 200 are provided at both sides of the main cushion 100, safety may be improved by the enlarged occupant protection region even at the time of an oblique head-on collision.

In the present exemplary embodiment, only the single auxiliary chamber 200 is provided at one side of the main cushion 100, but the scope of the present invention is not necessarily limited to thereto, and a plurality of auxiliary chambers 200 may be provided at sides selected from the upper, lower, left and right sides including the front side after dividing the size of the auxiliary chamber 200, as necessary.

The auxiliary chamber 200 is provided to have a smaller volume than the main cushion 100. The auxiliary chamber 200 may have 50% or less of a volume of the main cushion 100. Because the size of the auxiliary chamber 200 determines a time point of starting a step of decreasing (or maintaining) an internal pressure decreasing speed for the latter half of a period when the internal pressure of the main cushion 100 is controlled, it is difficult to effectively control the internal pressure of the main cushion 100 in a case in which the size of the auxiliary chamber 200 is excessively large.

In the present exemplary embodiment, a second vent 500, which discharges inside gas, is formed in a side surface of the auxiliary chamber 200. A size of the second vent 500 formed in the auxiliary chamber 200 is smaller than a size of the first vent 400 formed in the main cushion 100. Since the size of the second vent 500 is smaller than that of the first vent 400, the internal pressure decreasing speed of the main cushion 100 may be decreased by the second vent 500 after the auxiliary chamber 200 is deployed.

The active vent 300 is provided between the main cushion 100 and the auxiliary chamber 200 so as to selectively form a vent in accordance with an operation of the operating unit. Specifically, a vent hole of the active vent 300 is maintained in a closed state by a tether, but when the operating unit such as an airbag control unit (ACU) operates a tether cutter, the tether cutter cuts the tether, such that the vent hole of the active vent 300 is opened. When the vent hole of the active vent 300 is opened, the main cushion 100 and the auxiliary chamber 200 communicate with each other, such that the inside gas may flow.

The size of the active vent 300 is greater than the size of the second vent 500 formed in the auxiliary chamber 200.

An operation of the airbag module 1 having the aforementioned configuration will be described below.

In a first step, the main cushion 100 is expanded at a high speed by gas flowing in from the inflator 10 at the time of a vehicle collision so as to protect the occupant from impact.

In this step, a part of the inside gas may be discharged through the first vent 400 formed in the main cushion 100. In this step, as illustrated in FIG. 2, only the main cushion 100 is in an expanded state, and gas is discharged only by the first vent 400 formed in the main cushion 100.

In a second step, the active vent 300, which is provided between the main cushion 100 and the auxiliary chamber 200, is opened by the operating unit after a predetermined period of time has passed after the deployment of the main cushion 100.

In this step, the main cushion 100 and the auxiliary chamber 200 communicate with each other by the active vent 300, such that gas in the main cushion 100 flows to the auxiliary chamber 200. Accordingly, the auxiliary chamber 200 is expanded as illustrated in FIG. 3, such that the internal pressure of the main cushion 100 is quickly decreased, thereby reducing injury to a head part of the occupant. In this step, gas in the main cushion 100 is discharged to the outside of the main cushion 100 by the active vent 300 and the first vent 400.

In a third step, after the auxiliary chamber 200 is completely deployed by gas flowing from the main cushion 100, gas in the auxiliary chamber 200 is discharged through the second vent 500 formed in the auxiliary chamber 200.

Basically, because the second vent 500 formed in the auxiliary chamber 200 is smaller than the active vent 300 that allows the main cushion 100 and the auxiliary chamber 200 to communicate with each other, the internal pressure decreasing speed of the main cushion 100 in this step is higher than the internal pressure decreasing speed of the main cushion 100 in the second step.

Therefore, an excessive decrease in internal pressure due to the active vent 300 is prevented, thereby preventing an increase in injury to a neck of the occupant due to the excessive decrease in internal pressure.

The time point when the third step begins, that is, a time point when the auxiliary chamber 200 is completely deployed by gas flowing in from the main cushion 100 is determined by the size of the auxiliary chamber 200. Therefore, the size of the auxiliary chamber 200 is designed in consideration of the time point when the third step begins.

FIG. 4 is a graph illustrating internal pressure of the main cushion 100 with respect to time, when the airbag module 1 according to the present exemplary embodiment, an airbag module using a general vent, and the airbag module using the active vent 300 are operated.

Referring to FIG. 4, according to the airbag module 1 according to the present exemplary embodiment, it can be seen that there is an effect in that injury to the head and neck part of the occupant may be stably reduced because the internal pressure of the main cushion 100 is controlled by the three steps after the airbag module 1 is operated.

As described above, according to the airbag module 1 of the present invention, there is an effect in that a problem with an excessive decrease in internal pressure of the main cushion 100 due to the active vent 300 may be improved, and as a result, injury to the head or the neck of the occupant may be reduced when the airbag is operated.

It is possible to use the airbag module provided with the active vent 300 in the related art by merely additionally mounting the auxiliary chamber 200, and as a result, there is an effect in that the airbag module is easily manufactured, and operational performance is excellent because the internal pressure of the main cushion 100 is controlled by the three steps.

The inflator 10 generally needs to be used after increasing pressure of the inflator 10 when volume of the cushion in the airbag module is increased, but according to the airbag module 1 of the present exemplary embodiment, the lightweight inflator 10 in the related art may be applied because the configuration in which the main cushion 100 is deployed at the initial time is identical to that in the related art. That is, according to the airbag module 1 of the present invention, the occupant protection region is enlarged by the auxiliary chamber 200, but this configuration may be implemented without increasing a capacity of the inflator 10, thereby reducing costs.

In the aforementioned exemplary embodiment, the internal pressure decreasing speed of the main cushion 100 is further decreased than that in the related art for the latter half of a period during the operation of the airbag module 1 by restricting the size of the second vent 500 formed in the auxiliary chamber 200, but the scope of the present invention is not necessarily limited thereto.

For example, the second vent 500 may not be formed in the auxiliary chamber 200. In this case, the auxiliary chamber 200 is expanded and then deployed when the airbag module 1 is operated, and thereafter, gas is discharged only through the first vent 400 formed in the main cushion 100, such that the internal pressure decreasing speed of the main cushion 100 may be further decreased.

The first vent 400 may not be formed in the main cushion 100 in some cases. Even in this case, the internal pressure of the main cushion 100 may be controlled by the three steps.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An airbag module comprising:
a main cushion communicating directly with an inflator;
an auxiliary chamber which is provided at one side of the main cushion; and
an active vent which is provided between the main cushion and the auxiliary chamber, selectively forms a vent in accordance with an operation of an operating unit, and allows the main cushion and the auxiliary chamber to communicate with each other,
wherein the active vent is closed when the airbag is deflated, and the active vent opens when the main cushion is expanded by inflow gas,
wherein the main cushion has an impact zone that accepts an impact of a passenger during a collision, and the auxiliary chamber is disposed outside of the impact zone, and
wherein the main cushion includes a first vent, the auxiliary chamber includes a second vent that is smaller than the active vent, the first vent opens at a first time, the active vent opens at a second time subsequent to the first time, and the second vent opens at a third time subsequent to the second time.

2. The airbag module of claim 1, wherein the first vent through which gas is discharged is formed at one side of the main cushion.

3. The airbag module of claim 1, wherein the second vent through which gas is discharged is formed at one side of the auxiliary chamber.

4. The airbag module of claim 1, wherein a volume of the auxiliary chamber is 50% or less of a volume of the main cushion.

5. The airbag module of claim 1, wherein a size of the first vent formed at one side of the main cushion is greater than a size of the second vent formed at one side of the auxiliary chamber.

6. The airbag module of claim 1, wherein:
   the first vent hole is disposed in a side surface of the main cushion between the main cushion and atmosphere; and
   the second vent hole is disposed in a side surface of the auxiliary chamber between the auxiliary chamber and the atmosphere, the second vent hole being smaller than the first vent hole.

7. The airbag module of claim 6, wherein a volume of the auxiliary chamber is 50% or less of a volume of the main cushion.

8. The airbag module of claim 1, wherein the third time corresponds to a time when the auxiliary chamber is completely inflated.

9. The airbag module of claim 1, wherein a volume of the auxiliary chamber is determined based on the third time.

10. An airbag module comprising:
    a main cushion communicating directly with an inflator;
    an auxiliary chamber which is provided at one side of the main cushion, the auxiliary chamber having a volume smaller than a volume of the main cushion; and
    an active vent which is provided between the main cushion and the auxiliary chamber, selectively forms a vent in accordance with an operation of an operating unit, and allows the main cushion and the auxiliary chamber to communicate with each other,
    wherein the main cushion includes a first vent, the auxiliary chamber includes a second vent that is smaller than the active vent, the first vent opens at a first time, the active vent opens at a second time subsequent to the first time, and the second vent opens at a third time subsequent to the second time.

* * * * *